(12) United States Patent
Germain et al.

(10) Patent No.: US 7,234,714 B2
(45) Date of Patent: Jun. 26, 2007

(54) ROLL CONTROL SYSTEM FOR A MOTOR VEHICLE

(75) Inventors: Philippe Germain, Montreuil (FR); David Burke, Couddes (FR)

(73) Assignee: Delphi Technologies, Inc., Troy, MI (US)

( * ) Notice: Subject to any disclaimer, the term of this patent is extended or adjusted under 35 U.S.C. 154(b) by 412 days.

(21) Appl. No.: 10/483,166

(22) PCT Filed: Jul. 4, 2002

(86) PCT No.: PCT/EP02/07414

§ 371 (c)(1),
(2), (4) Date: Jul. 14, 2004

(87) PCT Pub. No.: WO03/008215

PCT Pub. Date: Jan. 30, 2003

(65) Prior Publication Data

US 2004/0239067 A1  Dec. 2, 2004

(30) Foreign Application Priority Data

Jul. 14, 2001 (GB) .................................. 0117210.5

(51) Int. Cl.
*B60G 21/055* (2006.01)
(52) U.S. Cl. .................. 280/124.107; 280/124.152; 267/220
(58) Field of Classification Search ......... 280/124.106, 280/124.107, 5.502, 5.508, 5.509, 5.511, 280/5.51; 267/220; 188/317, 314, 284, 188/276

See application file for complete search history.

(56) References Cited

U.S. PATENT DOCUMENTS 1,445,615 A * 2/1923 Ferres .......................... 188/269

(Continued)

FOREIGN PATENT DOCUMENTS

DE 2422825 A1 * 1/1975

(Continued)

*Primary Examiner*—Paul N. Dickson
*Assistant Examiner*—Robert A. Coker
(74) *Attorney, Agent, or Firm*—Scott A. McBain (57) ABSTRACT

(57) A roll control system (20) for installation between axially aligned wheels of a motor vehicle, the roll control system comprising a torsion bar (22); a damper (24) attached to one end (28) of the torsion bar and attachable to one of the wheels; and attachment means (25) attached to the other end (29) of the torsion bar and attachable to the other wheel; wherein the damper comprises an axially extending cylindrical housing (52); a piston (34) slidably mounted inside the housing; a piston rod (58) connected to the piston, extending out of one end (55) of the housing, and movable in an axial direction relative to the housing; a floating piston (35) slidably mounted in the housing between the piston and the other end of the housing; a compensation chamber (37) between the floating piston and the other end (54) of the housing containing a first pressurised fluid; a compression chamber (30) between the floating piston and the piston containing a second pressurised fluid; a rebound chamber (32) between the piston and the one end of the housing containing the second pressurised fluid; valve means (36) on the piston allowing restricted flow of the second pressurised fluid between the compression chamber and the rebound chamber; a rebound stop (60) positioned in the rebound chamber between the piston and the one end of the housing and providing a spring-effect on the movement of the piston towards the one end of the housing; and a compression stop (62) providing a spring-effect on the movement of the piston towards the floating piston. Provides an improved passive roll controle system.

15 Claims, 8 Drawing Sheets

U.S. PATENT DOCUMENTS 5,549,321 A * 8/1996 Novak et al. ......... 280/124.107
5,749,596 A * 5/1998 Jensen et al. ......... 280/124.166
6,276,693 B1 * 8/2001 Oakley et al. ........... 280/5.506
6,318,524 B1 * 11/2001 Lutz et al. .................. 188/284

FOREIGN PATENT DOCUMENTS

FR        2697474 A1 *  5/1994

* cited by examiner

ROLL CONTROL SYSTEM FOR A MOTOR VEHICLE

TECHNICAL FIELD

The present invention relates to a roll control system for a motor vehicle, and in particular to a passive or semi-active roll control system.

BACKGROUND OF THE INVENTION

In order to prevent excessive rolling (which has an impact on vehicle attitude and handling) of a motor vehicle, especially during cornering, it is known to provide a passive roll control system comprising a torsion bar between the front wheels of a motor vehicle, and, in some cases, a second torsion bar between the rear wheels. However, during straight line motion of a vehicle and when the vehicle is off-road, the torsion bar can have a detrimental effect on comfort and wheel articulation because the torsion bar provides solely a spring effect. Semi-active roll control systems have been proposed which monitor various vehicle conditions. Such roll control systems include a locking device associated with the torsion bar and the wheels. When the sensed vehicle conditions indicate roll stiffness is not required, the locking device is unlatched to effectively disconnect the effect of the torsion bar between the wheels. When the sensed vehicle conditions indicate that roll stiffness is required, the locking device is latched to connect the wheels by way of the torsion bar. EP-A-0829383 describes a roll control system having a latch/de-latch arrangement.

SUMMARY OF THE INVENTION

The object of the present invention is to provide an improvement to the known passive roll control systems, and, if required, adapt the passive system to provide a semi-active system.

A roll control system in accordance with the present invention for installation between axially aligned wheels of a motor vehicle comprises a torsion bar; a damper attached to one end of the torsion bar and attachable to one of the wheels; and attachment means attached to the other end of the torsion bar and attachable to the other wheel; wherein the damper comprises an axially extending cylindrical housing; a piston slidably mounted inside the housing; a piston rod connected to the piston, extending out of one end of the housing, and movable in an axial direction relative to the housing; a floating piston slidably mounted in the housing between the piston and the other end of the housing; a compensation chamber between the floating piston and the other end of the housing containing a first pressurised fluid; a compression chamber between the floating piston and the piston containing a second pressurised fluid; a rebound chamber between the piston and the one end of the housing containing the second pressurised fluid; valve means on the piston allowing restricted flow of the second pressurised fluid between the compression chamber and the rebound chamber; a rebound stop positioned in the rebound chamber between the piston and the one end of the housing and providing a spring-effect on the movement of the piston towards the one end of the housing; and a compression stop providing a spring-effect on the movement of the piston towards the floating piston.

The present invention provides an improved passive roll control system in which the passive spring of a standard torsion bar is replaced by the combined effect of a spring and damper acting together. The roll control system of the present invention can be easily adapted to provide a semi-active roll control system by controlling fluid flow between the compression and rebound chambers.

BRIEF DESCRIPTION OF THE DRAWINGS

The present invention will now be described, by way of example, with reference to the accompanying drawings, in whic.

DESCRIPTION OF THE PREFERRED EMBODIMENT

Figure 1:
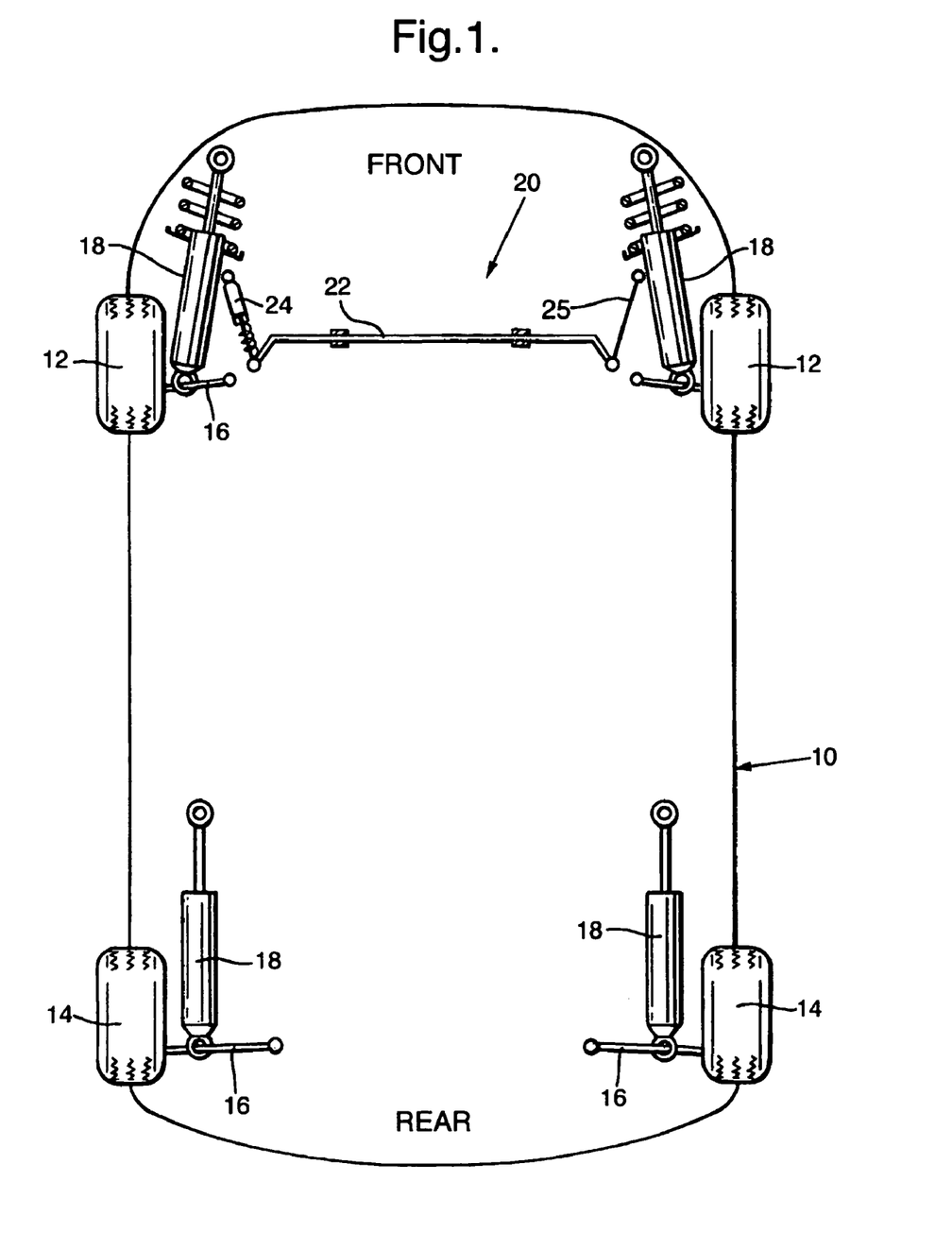
FIG. 1 is a schematic view of a motor vehicle having a roll control system in accordance with a first embodiment of the present invention.

FIG. 1 shows an outline of a motor vehicle 10 having a pair of front wheels 12 and a pair of rear wheels 14. Each wheel 12,14 is rotatably mounted on an axle 16 and attached to the body of the motor vehicle 10 by way of a suspension unit 18. A roll control system 20 in accordance with a first embodiment of the present invention is connected between the front wheels 12. Alternatively, a substantially identical roll control system may be connected between the rear wheels 14. As a further alternative, substantially identical roll control systems may be connected between the front wheels 12 and the rear wheels 14.

Figure 2:
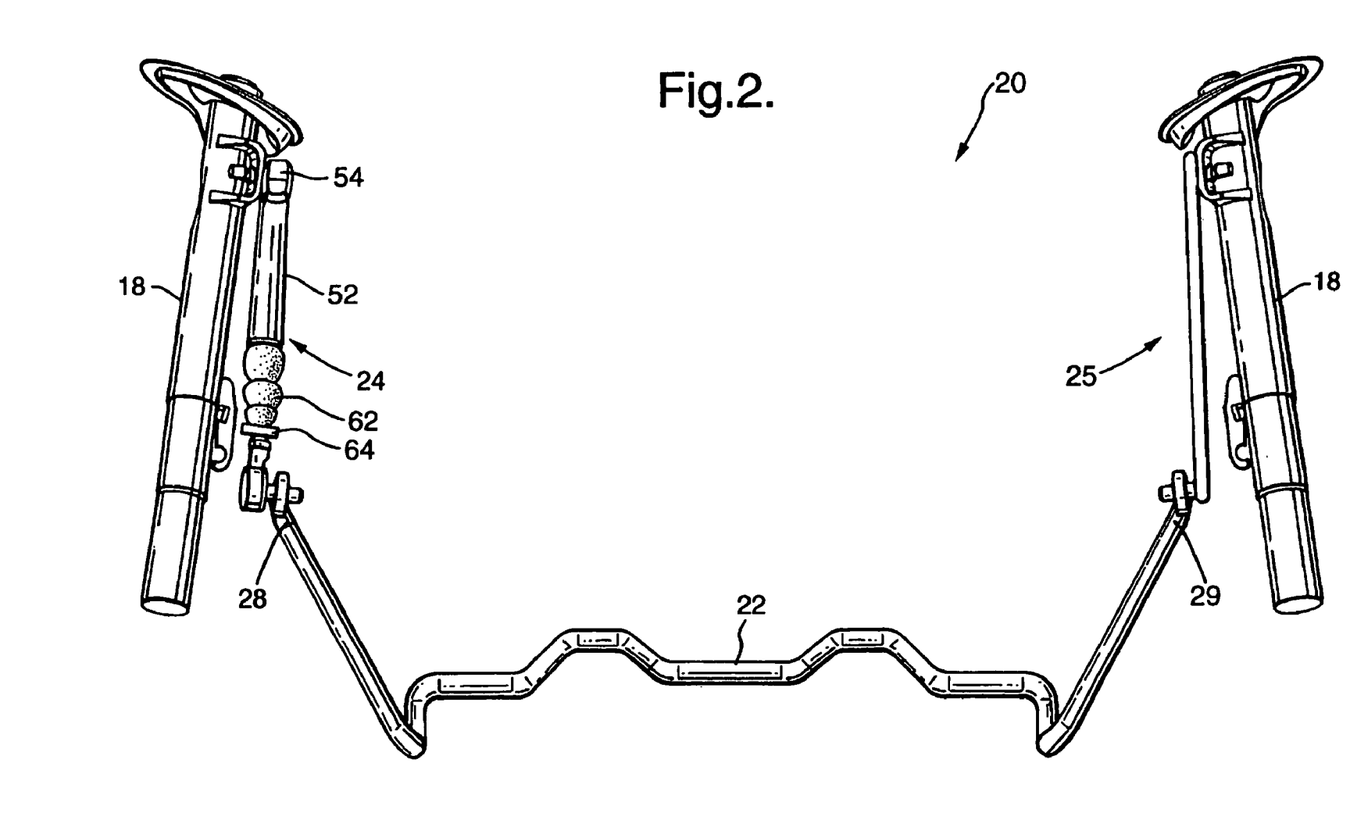
FIG. 2 is a perspective view of the roll control system of FIG. 1.

Referring to FIG. 2, the roll control system 20 comprises a torsion bar 22, a damper 24, and a substantially rigid arm 25. The damper 24 is mounted between one end 28 of the torsion bar 22 and one of the suspension units 18. The rigid arm 25 is mounted between the other end 29 of the torsion bar 22 and the other suspension unit 18.

Figure 3:
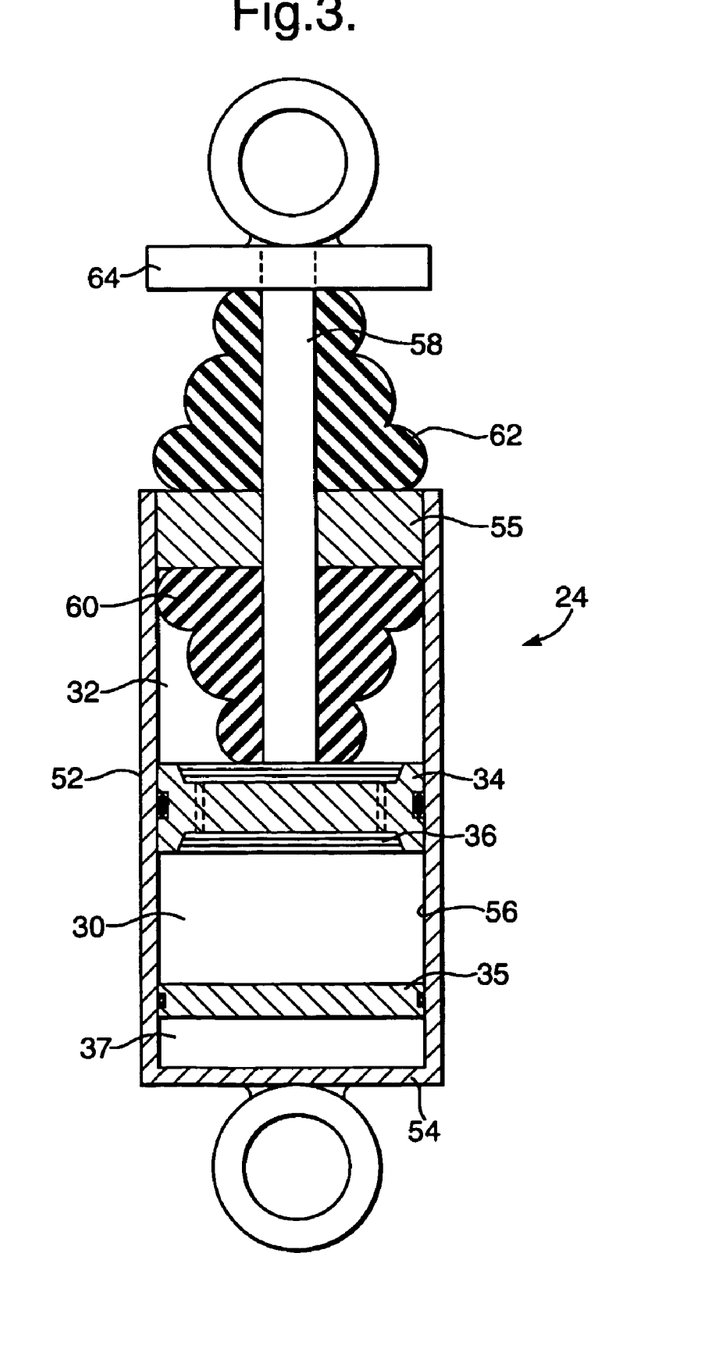
FIG. 3 is a schematic cross-sectional view of the damper of the roll control system of FIG. 2.

A preferred arrangement for the damper 24 is shown in FIG. 3. The damper 24 comprises an axially extending cylindrical housing 52 which has a closed first end 54, and a substantially closed second end 55. A piston 34 makes a sealing sliding fit with the inner surface 56 of the housing 52. A floating piston 35 makes a sealing sliding fit with the inner surface 56 of the housing 52 between the piston 34 and the closed first end 54. The piston 34 defines, within the housing 52, a first (compression) chamber 30 between the piston 34 and the floating piston 35, and a second (rebound) chamber 32 between the piston and the second end 55. The floating piston 35 defines, within the housing 52, a third (compensation) chamber 37 between the floating piston and the first end 54. A piston rod 58 is secured to the piston 34, extends through the rebound chamber 32 and out of the second end 55 of the housing 52, and is secured to one end 28 of the torsion bar 22. The first end 54 of the housing 52 is secured to the suspension unit 18. The piston 34 and piston rod 58 are movable together in the axial direction relative to the housing 52. The floating piston 35 is movable in the axial direction relative to the housing 52.

The compensation chamber 37 contains a first pressurised fluid, for example nitrogen. The compression chamber 30 and the rebound chamber 32 contain a second pressurised fluid, such as hydraulic fluid. A valve arrangement 36 is mounted on the piston 34 which allows a restricted flow of hydraulic fluid between the compression chamber 30 and the rebound chamber 32. A rebound stop 60, preferably of elastomeric material, is mounted on the piston rod 58 inside the rebound chamber 32. A compression stop 62, preferably of elastomeric material, is mounted on the piston rod 58 between the second end 55 of the housing 52 and a stop member 64 secured to the piston rod. In an alternative arrangement, the compression stop could be positioned in the compression chamber 30 between the piston 34 and the floating piston 35.

Figure 9:
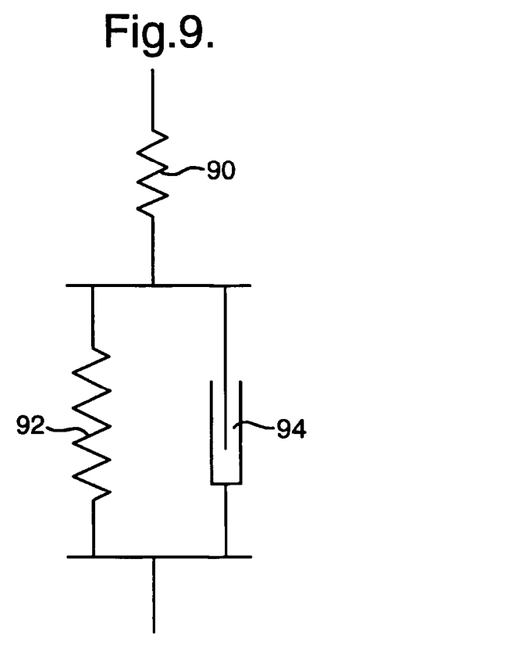
FIG. 9 is a schematic of the effect on roll control of a motor vehicle having a roll control system in accordance with the present invention.

The rebound stop 60 restricts axial movement of the piston 34 towards the second end 55 of the housing 52 during rebound movement of the damper 24 by providing a spring stiffness effect on the movement. The compression stop 62 restricts axial movement of the piston 34 towards the first end 54 of the housing 52 during compression movement of the damper 24 by providing a spring stiffness effect on the movement. With this arrangement, the characteristics of the torsion bar 22 are changed from a passive spring to a spring and damper acting together, as illustrated in FIG. 9, where spring 90 is the spring stiffness effect of the torsion bar 22, spring 92 is the spring stiffness effect of the stop 60 or 62, and damper 94 is the damping coefficient effect of the damper 24. Such an arrangement improves roll damping without affecting heave damping characteristics. The damping characteristics of the rebound stop 60 and the compression stop 62 are predetermined dependent on vehicle requirements, and can be adjusted by changing the material and/or properties and/or shape of the stops. For example, the elastomeric stops 60, 62 may be replaced by metallic coil springs, such as titanium springs.

Figure 4:
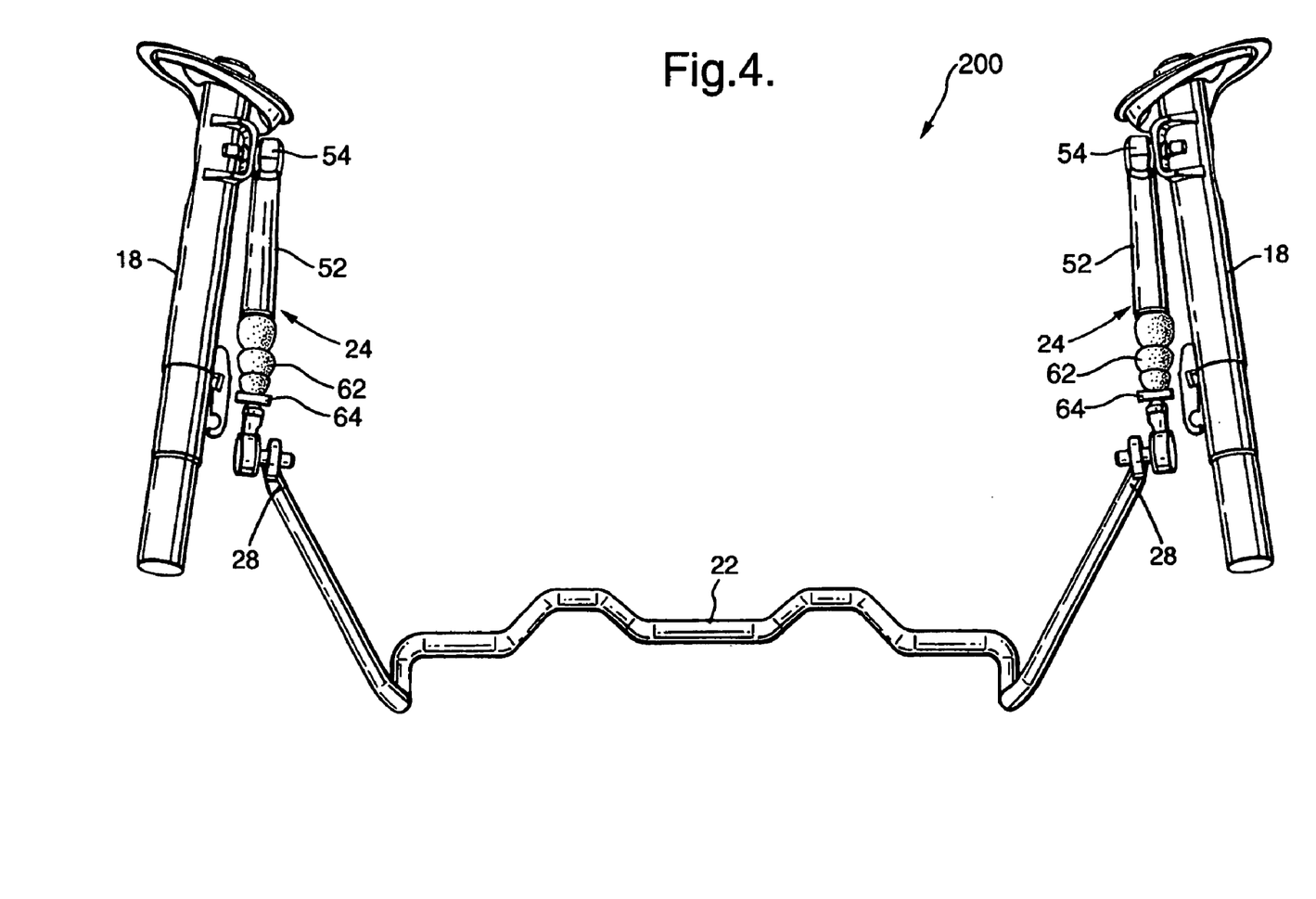
FIG. 4 is a perspective view of a roll control system in accordance with a second embodiment of the present invention.

FIG. 4 shows a second embodiment of roll control system 200 in accordance with the present invention which is substantially identical to the first embodiment, except that the rigid-arm has been replaced by a second damper 24. The two dampers 24 are substantially identical.

Figure 5:
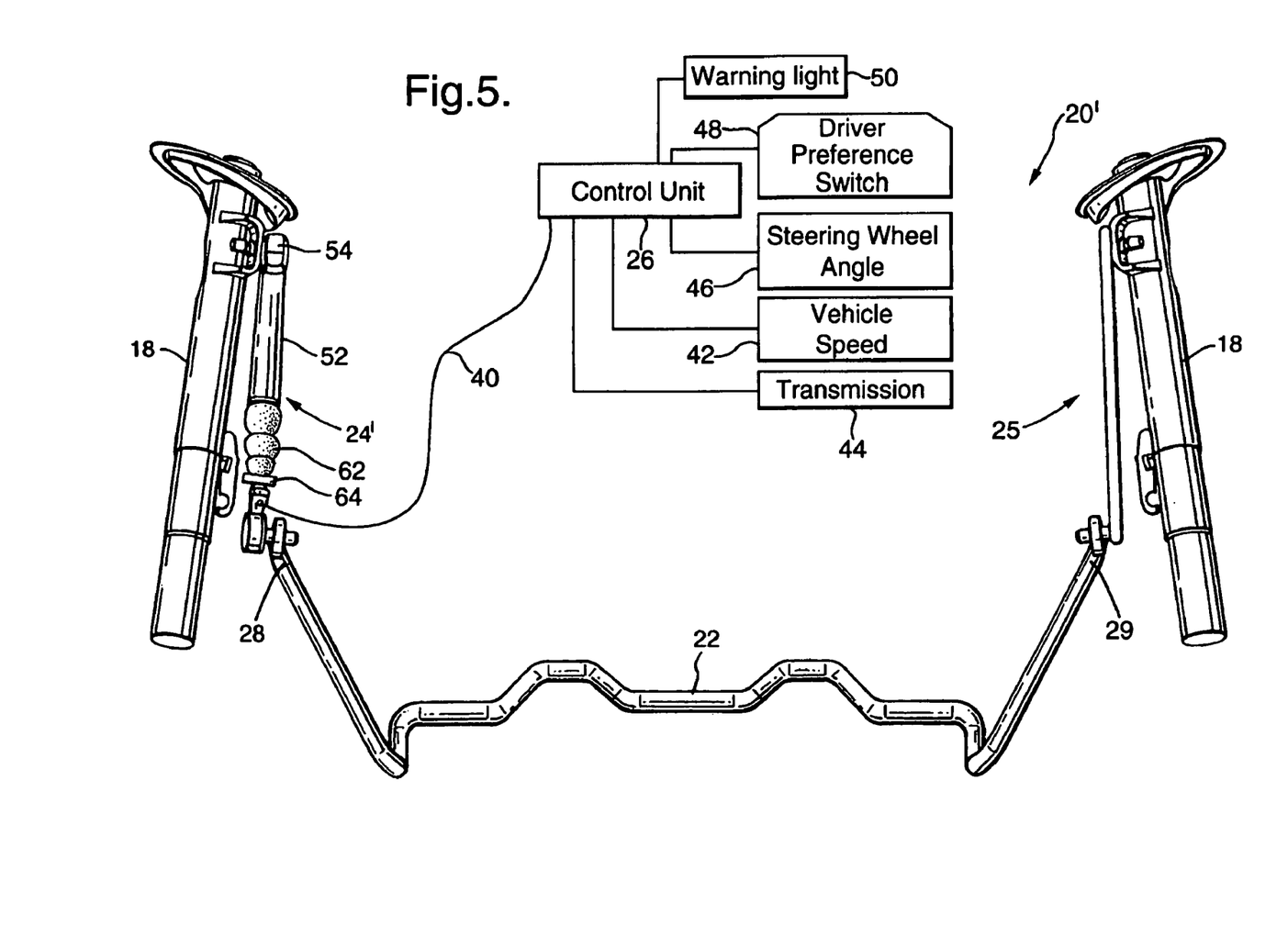
FIG. 5 is a perspective view of the roll control system in accordance with a third embodiment of the present invention.

FIG. 5 shows a third embodiment of roll control system 20' in accordance with the present invention which is substantially identical to the first embodiment. In this third embodiment, the valve arrangement of the damper 24' has been replaced by a solenoid actuated valve 36' (FIG. 6) which is electrically connected to a control unit 26 by a line 40.

Figure 6:
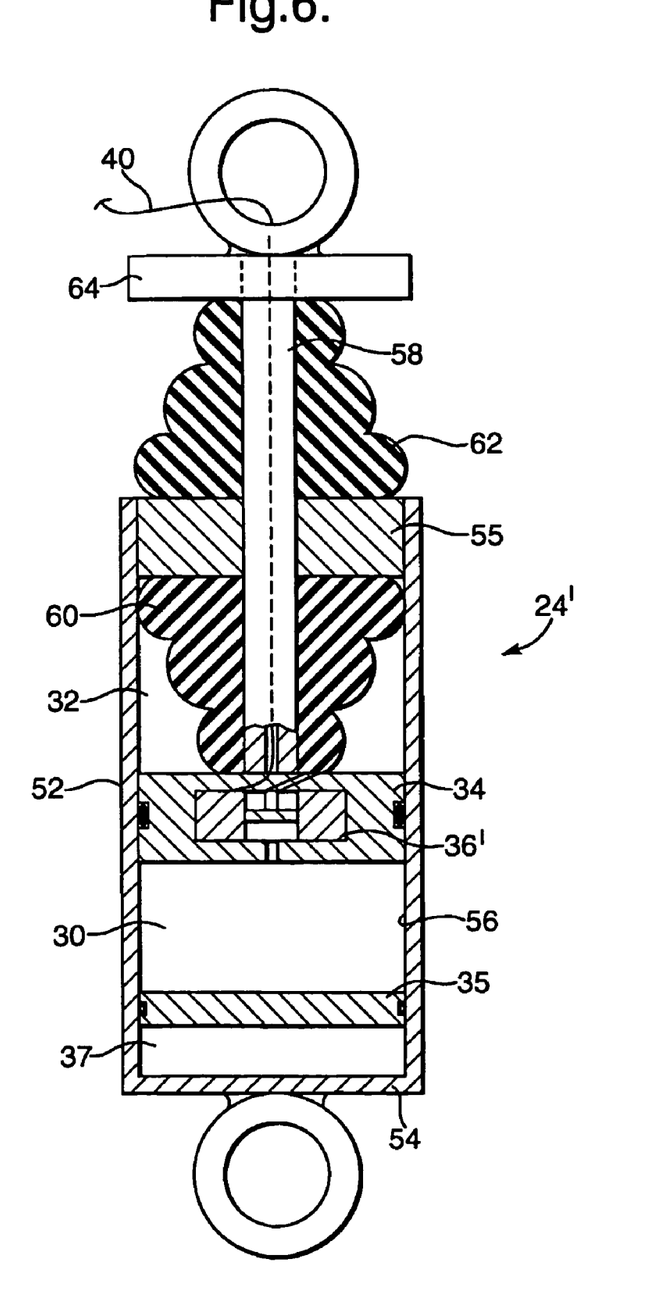
FIG. 6 is a cross-sectional view of the damper of the roll control system of FIG. 5.

The control unit 26 is preferably a microprocessor which receives signals from one or more sensors (such as a vehicle speed sensor 42, a transmission speed sensor 44, a steering wheel angle sensor 46, and/or a driver preference switch 48) monitoring certain vehicle conditions and/or driver preference. The control unit 26 controls the actuation of the valve 36', and hence controls the flow of hydraulic fluid between the compression chamber 30 and the rebound chamber 32, dependent on the signals received from the sensors and driver preference switch, and may also actuate an alarm, such as a warning light 50, inside the vehicle 10 during certain monitored conditions. The presence of the control unit 26 and the electrically controlled valve 36' provide the option of a semi-active roll control system in which the damping characteristics of the damper 24' may be adjusted dependent on predetermined vehicle conditions.

Figure 7:
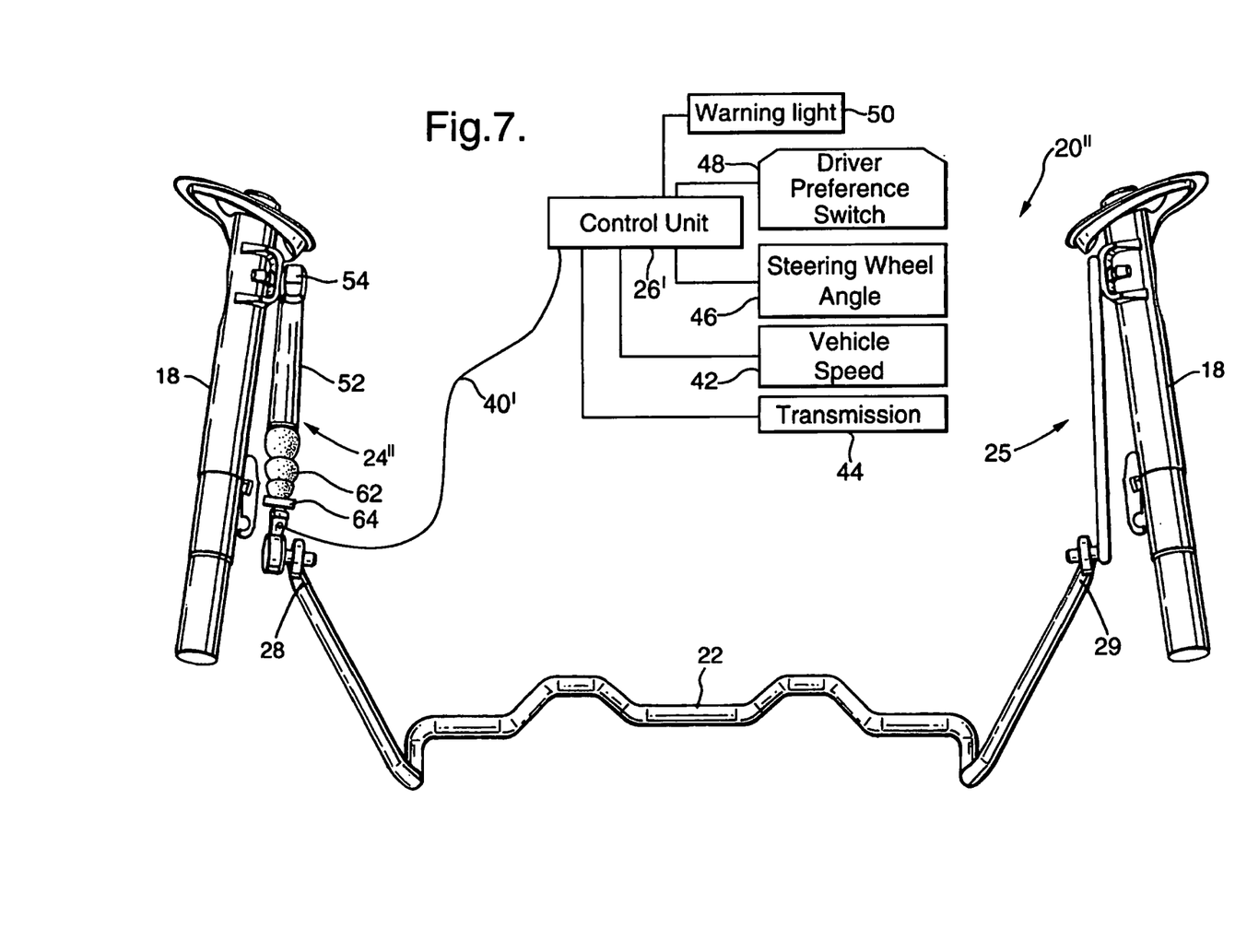
FIG. 7 is a perspective view of the roll control system in accordance with a fourth embodiment of the present invention.
Figure 8:
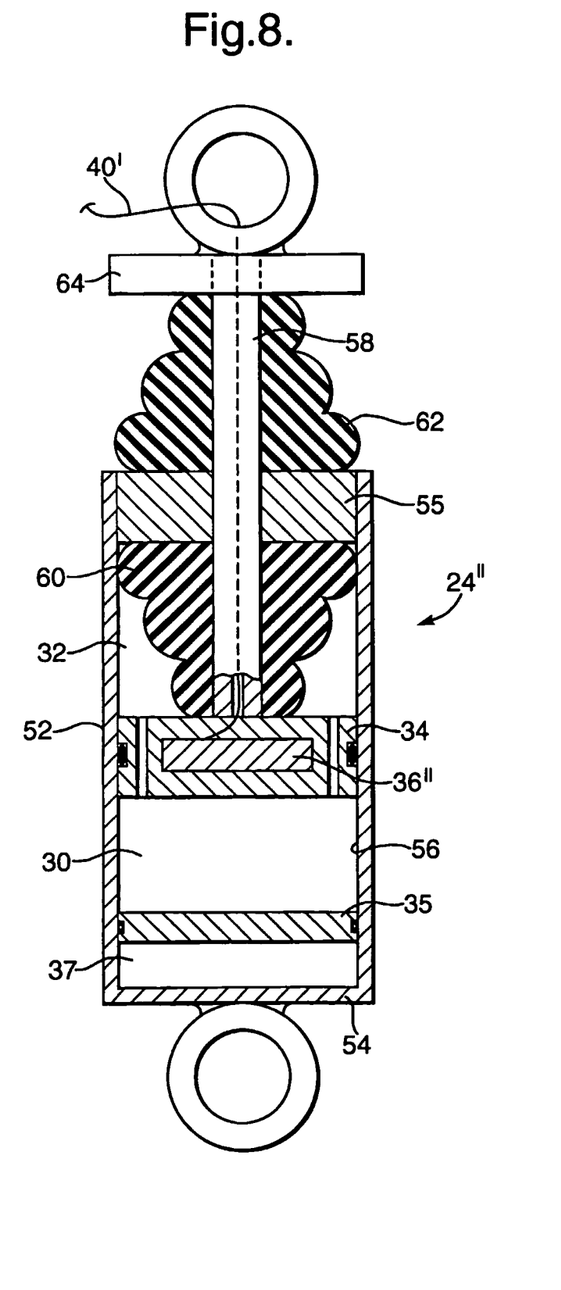
FIG. 8 is a cross-sectional view of the damper of the roll control system of FIG. 7.

FIG. 7 shows a fourth embodiment of roll control system 20" in accordance with the present invention which is substantially identical to the first embodiment. In this fourth embodiment, the fluid in the compression chamber 30 and the rebound chamber 32 is a magnetorheological fluid, and the valve arrangement comprises an orifice 39 in the piston 34, with an associated viscosity control device 36" mounted on the piston 34 (FIG. 8). The control device 36" creates a variable magnetic field on the fluid in the orifice 39, and is electrically connected to a control unit 26' by a line 40'.

The control unit 26' is preferably a microprocessor which receives signals from one or more sensors (such as a vehicle speed sensor 42, a transmission speed sensor 44, a steering wheel angle sensor 46, and/or a driver preference switch 48) monitoring certain vehicle conditions and/or driver preference. The control unit 26' controls the actuation of the control device 36", and hence controls the viscosity of the magnetorheological fluid as the fluid passes between the compression chamber 30 and the rebound chamber 32, dependent on the signals received from the sensors and driver preference switch, and may also actuate an alarm, such as a warning light 50, inside the vehicle 10 during certain monitored conditions. The presence of the control unit 26', the magnetorheological fluid, and the control device 36" provide the option of a semi-active roll control system in which the damping characteristics of the damper 24" may be adjusted dependent on predetermined vehicle conditions, up to the point of locking of the damper 24".

Alternative arrangements for the above described embodiments for the or each damper 24 may be used. For example, the mounting arrangement of the damper 24 may be reversed with the piston rod 58 attached to the suspension unit 18 and the housing 52 attached to the torsion bar 22.

The present invention provides a roll control system in which the passive spring of a standard torsion bar is replaced by a spring and damper acting together, thereby providing an improved passive roll control system. The roll control system can be easily altered to provide a semi-active roll control system by controlling fluid flow between the compression and rebound chambers.

The invention claimed is:

1. A roll control system for installation between axially aligned wheels of a motor vehicle, the roll control system comprising a torsion bar; a damper attached to one end of the torsion bar and attachable to one of the wheels; and attachment means attached to the other end of the torsion bar and attachable to the other wheel; wherein the damper comprises an axially extending cylindrical housing; a piston slidably mounted inside the housing; a piston rod connected to the piston, extending out of one end of the housing, and movable in an axial direction relative to the housing; a floating piston slidably mounted in the housing between the piston and the other end of the housing; a compensation chamber between the floating piston and the other end of the housing containing a first pressurised fluid; a compression chamber between the floating piston and the piston containing a second pressurised fluid; a rebound chamber between the piston and the one end of the housing containing the second pressurised fluid; valve means on the piston allowing restricted flow of the second pressurised fluid between the compression chamber and the rebound chamber; a rebound stop positioned in the rebound chamber between the piston and the one end of the housing and providing a spring-effect on the movement of the piston towards the one end of the housing; and a compression stop providing a spring-effect on the movement of the piston towards the floating piston.

2. A roll control system as claimed in claim 1, wherein the compression stop is positioned around the piston rod outside of the housing between a stop member secured to the piston rod and the one end of the housing.

3. A roll control system as claimed in claim 1, wherein the compression stop and/or the rebound stop is formed from elastomeric material.

4. A roll control system as claimed in claim 1, wherein the compression stop and/or the rebound stop is a metallic spring.

5. A roll control system as claimed in claim 1, wherein the first pressurised fluid is nitrogen.

6. A roll control system as claimed in claim 1, wherein the second pressurised fluid is hydraulic fluid.

7. A roll control system as claimed in claim 1, wherein the valve means is electronically actuated; the system further comprising an electronic control unit monitoring one or more predetermined signals, the control unit being electrically connected to the valve means to control the flow of the second pressurised fluid between the compression chamber and the rebound chamber dependent on the monitored predetermined signals.

8. A roll control system as claimed in claim 7, wherein the valve means is a solenoid valve.

9. A roll control system as claimed in claim 1, wherein the second pressurised fluid is a magnetorheological fluid; and wherein the valve means is an electrically actuated viscosity control device; the system further comprising an electronic control unit monitoring one or more predetermined signals, the control unit being electrically connected to the control device to control the viscosity of the magnetorheological fluid passing between the compression chamber and the rebound chamber dependent on the monitored predetermined signals.

10. A roll control system as claimed in claim 7, wherein the control unit is a microprocessor which is electrically connected to, and receives the predetermined signals from, one or more sensors mountable on the vehicle and monitoring predetermined vehicle operating conditions, and/or a driver preference switch.

11. A roll control system as claimed in claim 1, wherein the attachment means comprises a second damper, the two dampers being substantially identical.

12. A roll control system as claimed in claim 1, wherein the attachment means is a rigid arm.

13. A roll control system as claimed in claim 1, wherein the piston rod of the or each damper is attached to the torsion bar.

14. A roll control system as claimed in claim 2, wherein the compression stop and/or the rebound stop is formed from elastomeric material.

15. A roll control system as claimed in claim 2, wherein the compression stop and/or the rebound stop is a metallic spring.

* * * * *